US008522438B2

(12) United States Patent
Gopalanarayanan et al.

(10) Patent No.: US 8,522,438 B2
(45) Date of Patent: Sep. 3, 2013

(54) DEVELOPER ROLLS HAVING A TUNED RESISTIVITY METHOD FOR MAKING

(71) Applicant: Lexmark International, Inc., Lexington, KY (US)

(72) Inventors: Bhaskar Gopalanarayanan, Lexington, KY (US); Kelly Ann Killeen, Lexington, KY (US); Johnny Dale Massie, II, Lexington, KY (US); Ronald Lloyd Roe, Lexington, KY (US); James Joseph Semler, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 13/717,933

(22) Filed: Dec. 18, 2012

(65) Prior Publication Data

US 2013/0129933 A1 May 23, 2013

Related U.S. Application Data

(62) Division of application No. 11/682,901, filed on Mar. 7, 2007, now Pat. No. 8,398,532.

(51) Int. Cl.
*B21K 1/02* (2006.01)
*F16C 13/00* (2006.01)

(52) U.S. Cl.
USPC ......... 29/895.32; 29/895.11; 492/56; 492/38; 492/17; 399/286

(58) Field of Classification Search
USPC ....... 29/895.32, 895, 895.2, 895.21, 895.211; 492/17, 18, 38, 56, 59; 399/286, 176, 279, 399/111, 119
See application file for complete search history.

(56) References Cited

U.S. PATENT DOCUMENTS

| | | | | |
|---|---|---|---|---|
| 5,804,114 | A | 9/1998 | Janes et al. | |
| 6,150,025 | A * | 11/2000 | Roe et al. | 428/423.1 |
| 6,352,771 | B1 | 3/2002 | Chiang et al. | |
| 6,619,329 | B2 * | 9/2003 | Ikemoto et al. | 138/126 |
| RE39,744 | E * | 7/2007 | Ishii et al. | 568/818 |
| 7,291,663 | B2 * | 11/2007 | Hattori et al. | 524/168 |
| 7,535,462 | B2 * | 5/2009 | Spath et al. | 345/174 |
| 7,544,158 | B2 * | 6/2009 | Yamada et al. | 492/56 |
| 7,727,134 | B2 * | 6/2010 | Nakamura et al. | 492/18 |
| 2003/0044620 | A1 * | 3/2003 | Okoroafor et al. | 428/423.5 |
| 2003/0100623 | A1 * | 5/2003 | Kaku et al. | 521/155 |
| 2004/0024166 | A1 * | 2/2004 | Hattori et al. | 528/66 |
| 2004/0110617 | A1 * | 6/2004 | Mizumoto | 492/56 |
| 2005/0154149 | A1 * | 7/2005 | Beach et al. | 525/453 |
| 2006/0252619 | A1 * | 11/2006 | Yamada et al. | 492/56 |
| 2007/0111874 | A1 * | 5/2007 | Sugimura et al. | 492/59 |
| 2008/0021154 | A1 * | 1/2008 | Haider et al. | 525/54.2 |
| 2008/0071028 | A1 | 3/2008 | Minagoshi et al. | |
| 2010/0155677 | A1 | 6/2010 | Beach et al. | |

* cited by examiner

*Primary Examiner* — Sarang Afzali
(74) *Attorney, Agent, or Firm* — Justin M. Tromp

(57) ABSTRACT

A method for making a developer roll by molding a metal shaft with a conductive or semi-conductive soft rubber forming a rubber core and a coating deposited on the soft rubber core wherein the coating has a conductive agent. The outer surface of the soft rubber core is modified to form an —OH rich surface layer before the coating is deposited onto the outer surface of the rubber core to chemically bond therein.

12 Claims, 2 Drawing Sheets

DEVELOPER ROLLS HAVING A TUNED RESISTIVITY METHOD FOR MAKING

CROSS-REFERENCE TO RELATED APPLICATIONS

This patent application is a divisional application of U.S. patent application Ser. No. 11/682,901, filed Mar. 7, 2007, now U.S. Pat. No. 8,398,532, entitled "Developer Rolls Having A Tuned Resistivity."

TECHNICAL FIELD

The present invention is directed generally to the field of electrophotographic printing and more particularly to a developer roll with a tuned resistivity.

BACKGROUND

Many electrophotographic developer roller coatings including polyurethane/urea, silicones, polyesters, and polyamides, are inherently quite resistive in nature. These developer roller coatings, when used on certain soft rubber cores, such as epicholorohydrin (ECO) or ionically conductive urethane rubbers, exhibit lower resistivity than they inherently are. While not being limited to a theory, it is believed that this phenomenon is due to the physico-chemical interaction of the core rubber with the coating. This interaction results in a resistivity gradient through the thickness of the coating with highest resistivity closer to the outer surface of the coating. In addition, this gradient in resistivity can cause large fluctuations in overall coating resistivity due to coating thickness variation. This gradient in resistivity is also affected by process conditions, such as cure time, temperature, and aging. The variation in overall resistivity and the resistive thickness of the coating affects the precise functioning of the precise developer roll.

Hence, there is a clear need for modification of resistivity in the developer roll to help precisely control the toner development in electrophotography.

SUMMARY

Some embodiments of the present application related to new and improved methods and developer rolls for controlling resistivity of the developer roll in electrophotography. One embodiment of the present application comprises a developer roll having a tuned resistivity. The developer roll comprises a conductive or semi-conductive soft rubber core having an outer surface. The soft rubber core is molded on a metal shaft. A coating is deposited on the outer surface of the soft rubber core, wherein the coating comprises a conductive agent. The outer surface of the soft rubber core is typically modified before the coating is deposited on the outer surface of the soft rubber core.

Another aspect of the present application is a method for making a developer roll having a tuned resistivity. The method comprises molding a metal shaft with a conductive or semi-conductive soft rubber to form a rubber core; modifying an outside surface of the rubber core, wherein the modifying comprises UV-ozone treatment; coating the modified rubber core with a polyurethane prepolymer and a conductive additive; wherein the conductive or semi-conductive soft rubber comprises one or more rubbers selected form the group of consisting of: silicone rubber, nitrile rubber, ethylene propylene (EP) copolymers, polybutadiene, styrene-co-butadiene, isoprene rubber, or a blend of one or more of the rubbers.

These developer rolls and methods are advantageous for creating developer rolls with modified resistivity to control the development process. Additional advantages will be apparent in light of the detailed description.

BRIEF DESCRIPTION OF THE DRAWINGS

While the specification concludes with claims, particularly pointing out and distinctly claiming the present invention, it is believed the same will be better understood from the following description taken in conjunction with the accompanying drawings in which:

Figure 1:
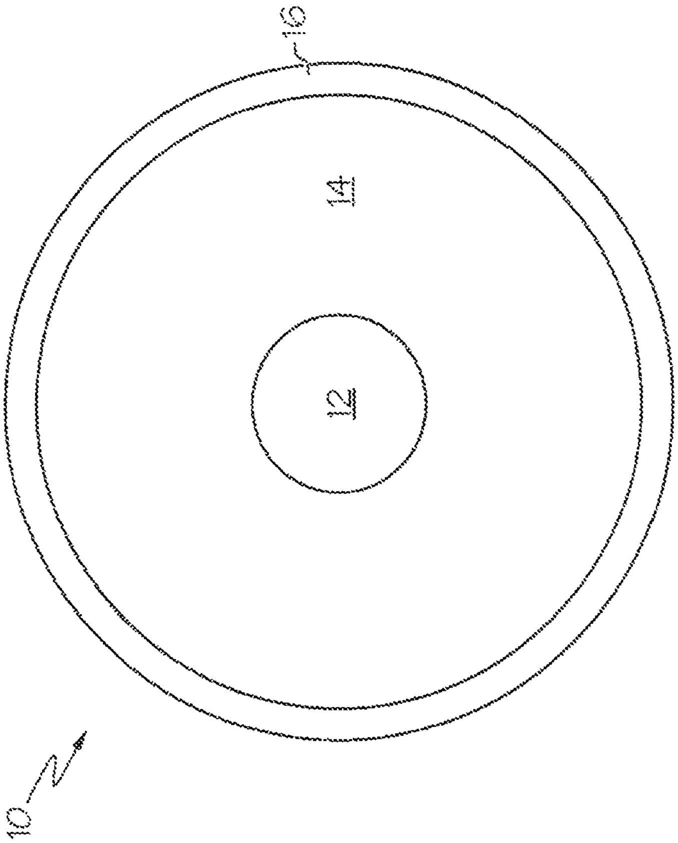
FIG. 1 is schematic illustration of a developer roll according to one embodiment of the present invention.

The embodiments set forth in the drawings are illustrative in nature and not intended to be limiting of the invention defined by the claims. Moreover, the individual features of the drawings and the invention will be more fully apparent and understood in view of the detailed description.

DETAILED DESCRIPTION OF THE EXEMPLARY EMBODIMENTS

Reference will now be made in detail to various embodiments which are illustrated in the accompanying drawings wherein like numerals indicate similar elements throughout the views.

One embodiment of the present invention is a developer roll 10 which comprises a semi-conductive or conductive soft rubber core 14 having an outer surface, wherein the soft rubber core 14 is molded on a metal shaft 12. A coating 16 is deposited on the outer surface of the soft rubber core 14. The coating comprises at least one conductive agent. The outer surface of the soft rubber core 14 is modified before the coating 16 is deposited on the outer surface of the soft rubber core 14.

Another embodiment of the present invention comprises the addition of conductive agents to the coating formulation applied to a conductive or semi-conductive soft rubber core of the developer roll. In this embodiment, the interaction between the core and the coating may not result in the lowering of the inherent resistivity of the applied coating since the rubber material or the low molecular weight extractable content of the rubber material is not intrinsically conductive as compared to an ECO-rubber system. The addition of one or more conductive agents aids in tuning the desired resistivity of the coatings. This modification of resistivity helps precisely control the toner development in electrophotography. In addition, exemplary embodiments of the present invention are less sensitive to process factors such as cure time, temperature, and aging. The predictability of the effective resistivity and thickness of the resistive portion of the coating is improved with this embodiment. In one exemplary embodiment, the target resistivity of approximately $5.0\times10^{10}$-$3.0\times10^{12}$ ohm-cm at 15.6° C./20% relative humidity (RH) is achievable with a decreased coating thickness. Moreover, a decreased coating thickness provides for improved functional performance in a printer by improving the print quality, and ease of manufacturing of the roller due to a lower coating mass which can effect the coating quality by running, sagging, bubbles and other typical coating defects. In addition, the reduced amount of materials decreases the coating cost and provides more consistent, predictable electrical properties.

In one exemplary embodiment, the coating material is based on a polyurethane prepolymer or a combination of two or more polyurethane prepolymers. The isocyanate portion of the prepolymer(s) may comprise toluene diisocyanate (TDI), polymeric TDI, diphenylmethane diisocyanate (MDI), polymeric MDI, 1,6-hexamethylene diisocyante (HDI), polymeric HDI, isophorone diisocyanate (IPDI), polymeric IPDI, dicyclohexylmethane diisocyanate ($H_{12}$MDI), and polymeric $H_{12}$ MDI, other commonly used isocynate portions known to those skilled in the art, and mixtures thereof. The polyol portion may comprise a polyether, polyester (both adipate or caprolactone based) or polybutadiene system. Exemplary conductive additives for the coating comprise either ionic additives such as $LiPF_6$, $LiAsF_6$, $LiClO_4$, $LiBF_4$, $LiCF_3SO_3$, $LiN(SO_2CF_3)_2$, $LiC(SO_2CF_3)_3$, $LiPF_3(C_2F_5)$, $Cs(CF_3COCH_2COCF_3)$—(abbreviated as CsHFAc), $KPF_6$, $NaPF_6$, $CuCl_2$, $FeCl_3$, $FeCl_2$, $Bu_4NPF_6$, $Bu_4NSO_3CF_3$, $Bu_4NCl$, $Bu_4NBr$, dimethylethyldodecylammonium ethosulfate or other ionic additives commonly known to those skilled in the art to increase conductivity. In an alternative embodiment, the conductive additives comprise inherently conduct polymers (ICP) such as polyaniline, poly(3-alkylthiophenes), poly(p-phenylenes), and poly(acetylenes).

In another exemplary embodiment, the core or rubber substrate comprises a conductive rubber selected from the group: silicone rubber, nitrile rubber, ethylene propylene (EP), ethylene propylene diene methylene terpolymer (EPDM), polybutadiene, styrene-co-butadiene, or isoprene rubber or a blend of any of these rubbers. In one exemplary embodiment, the core rubber further comprises a conductive additive selected from the group comprising carbon black, carbon nanoparticles, carbon fibers, or graphite.

In one exemplary embodiment, the coating is based on a caprolactone-$H_{12}$MDI urethane with a conductive additive such as CsHFAc. In this embodiment, the coating is applied by any conventional means known to those skilled in the art, such as dip or spray coating. The materials may be dissolved into appropriate solvent for ease of use. A catalyst may or not be added to increase the reactivity of the polyurethane. In addition, other additives, such as a surfactant or defoamer, may be added to facilitate the coating process. In one exemplary embodiment, the urethane coating may be a moisture cure system. In another embodiment, curatives such as polyol or polyamine may be added to react with and cure the polyurethane. Examples of such curatives include but are not limited to, polycaprolactone polyols, polyether polyols, polyester polyols, aliphatic-polycarbonate polyols, polybutadiene diol, polydimethylsiloxane polyols, or polydimethylsiloxane diamines.

In another exemplary embodiment, the coating is based on a mixture of caprolactone-$H_{12}$MDI and caprolactone-TDI urethanes with a conductive additive such as CsHFAc. In this embodiment, the coating is applied by any conventional means known to those skilled in the art, such as dip or spray coating. The materials may be dissolved into appropriate solvent for ease of use. A catalyst may or not be added to increase the reactivity of the polyurethane. In addition, other additives, such as a surfactant or defoamer, may be added to facilitate the coating process. In one exemplary embodiment, the urethane coating may be a moisture cure system. In another embodiment, curatives such as polyol or polyamine may be added to react with and cure the polyurethane. Examples of such curatives include but are not limited to, polycaprolactone polyols, polyether polyols, polyester polyols, aliphatic-polycarbonate polyols, polybutadiene diol, polydimethylsiloxane polyols, or polydimethylsiloxane diamines.

In another exemplary embodiment, the coating is based on a mixture of caprolactone-$H_{12}$MDI and caprolactone-TDI urethane cured with polyether polyols with a conductive additive such as CsHFAc. In certain embodiments without this curative or additive may exhibit compatibility issues with components such as toner or toner adding roller or doctoring blade. Such incompatibility may be exacerbated by temperature, humidity or time. The addition of polyether polyols either as a curative or additive provides significant improvement in compatibility with various cartridge components that may come in contact with. In one exemplary embodiment, the urethane coating may be a moisture cure system. In another embodiment, additional curatives such as polyol or polyamine may be added to react with and cure the polyurethane. Examples of such curatives include but are not limited to, polycaprolactone polyols, polyether polyols, polyester polyols, aliphatic-polycarbonate polyols, polybutadiene diol, polydimethylsiloxane polyols, or polydimethylsiloxane diamines.

In one exemplary embodiment, the soft rubber core is modified before the coating is deposited. Due to the low surface energy of the soft rubber core, such as silicone, typically either a primer layer or surface modification may be utilized in order to increase the surface energy of the silicone. Low surface energy can lead to poor adhesion and thus the urethane coating delaminating from the surface of the silicone core. There are many processes that can be used to modify the surface of silicone such as oxygen plasma, flame treatment, ultraviolet (UV)-ozone, etc. and others known to those skilled in the art.

In one exemplary embodiment, an ultraviolet radiation (UV)-ozone treatment is utilized to treat the surface of the soft rubber core. In the presence of an oxygen containing atmosphere, UV radiation at wavelengths of 184.9 nm and 253.7 nm is known to break down diatomic oxygen and ozone, respectively. While not being limited to a theory, it is believed that the 184.9 nm wavelength breaks down diatomic oxygen into atomic oxygen, while the 253.7 nm wavelength breaks ozone into atomic oxygen plus diatomic oxygen. The atomic oxygen then oxidizes the surface of the silicone to produce an —OH rich surface layer. The —OH functionality is then available to react with the isocyanate groups in the polyurethane chain of the coating to produce a chemical bond.

In one exemplary embodiment to treat the surface of a silicone developer roll, a Jelight™ UV-Ozone cleaner (Model 256) is utilized. The Model 256 has a 16 by 16 inch treatment area with two 28-milowatts/$cm^2$ mercury vapor lamps that emit UV light at 184.9 and 253.7 nm wavelengths. In one exemplary embodiment to ensure treatment of the entire upper roll surface, the following procedure can be utilized: (1.) The developer rolls are loaded into a rotating device. The rotating device consists of a DC motor capable of turning at a rate of 145 RPM, which is coupled to the rotational elements of the fixture via spur gears. The rotational elements consist of sealed bearings with couplings that hold the ends of the developer roll shaft (2.) The rotator is then placed in the UV-ozone chamber drawer. (3.) The rotator is activated to begin rotation. (4.) The treating cycle time on the UV-ozone chamber is set to at least 5 minutes and in exhaust cycle (for safe removal of ozone from the chamber) time is set to five seconds. (5.) The treating process begins and after completion the roll is removed from the chamber and coated with the desired formulation.

EXPERIMENTS

Experiment 1

Figure 2:
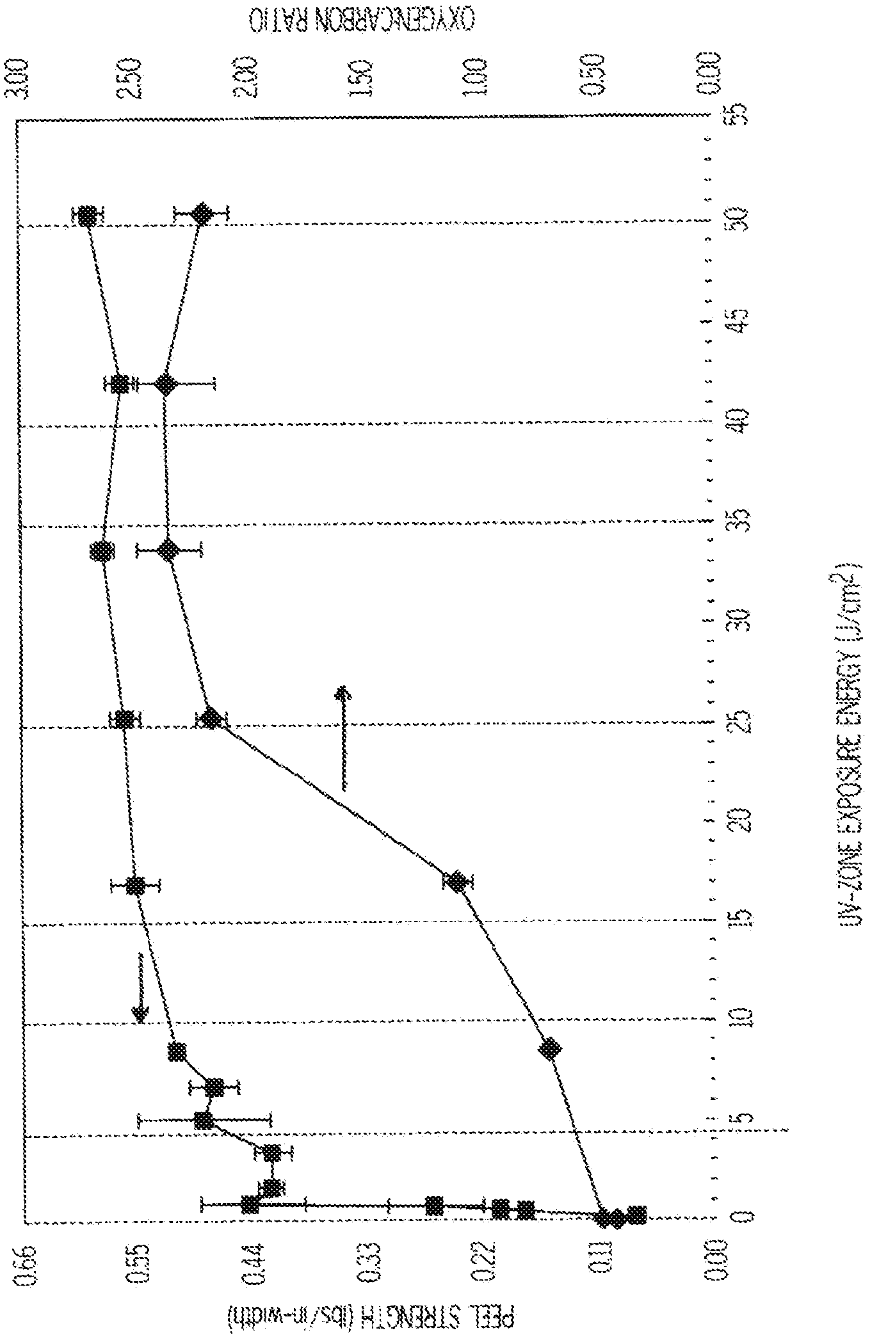
FIG. 2 is a graph illustrating exemplary results from Experiment 1.

In this experiment, the level of —OH functionality produced on the surface of the soft rubber core was measured as a function of the UV-ozone exposure before application of the outer coating. To monitor the change in —OH functionality, the oxygen:carbon ratio at the surface was measured using x-ray photoelectron spectroscopy (XPS). The samples were outgassed at ambient temperature overnight and analyzed using a 300 mm2 x-ray beam with an argon flood gun to compensate for sample charging. Survey spectra were collected for each sample and followed by high resolution spectra of the specific elemental peaks. Surface atomic concentrations were calculated from the high resolution spectra and normalized to 100%. Developer rolls exposed under the same conditions and from the same lots as the XPS samples were then coated with an isocyanate based polyurethane coating using a standard high volume low pressure gravitational (HVLP) spray system. The coating was applied using multiple passes with each pass being approximately 20-25 microns thick. In between each pass solvent was allowed to flash off from the developer roll in a standard chemical hood for 10-15 minutes. After coating the developer rollers were cured at 22.2° C./50% RH for 16 hours followed by a post bake at 60° C. for another 16 hours. Peel tests were conducted to establish the level of adhesion versus the amount of energy exposure. The resulting-data is shown in FIG. 2. As the level of energy exposure increases, the number of —OH functional groups on the surface increases. This allows for more bonds to be formed with the isocyanates in the polyurethane coating. This ultimately improves the adhesion between the core and the coating as seen by the peel strength increase. The discrepancy between, the trend of the peel strength with that of the oxygen:carbon ratio is due to the tear strength of the silicone. After five minutes, the adhesion of the coating with the core is greater than the tear strength of the core, which leads to the plateau of the peel strength.

Experiment 2

In this experiment, exemplary coating formulations were applied to Q-panels (metal panels) or rubber substrates. In some cases, coatings were fully cured then peeled off the rubber substrates for analysis as thin-film samples. The Q-panels and thin-film samples are utilized for basic data collection and coating properties, whereas coatings analyzed on rubber substrates allow for functional assessments.

Chemglaze® V021 (Lord Corporation) and Vibrathane® 6060 (Chemtura) comprise polycaprolactone-$H_{12}$MDI and polycaprolactone-TDI prepolymers, respectively. Polyol 3165 (Perstorp Polyols, Inc.) is a polyether polyol and Silaplane FM-DA21 (Chisso Corp.) is a polydimethylsiloxane polyol. Coating solutions were prepared at 30-40% solids in Chemglaze® 9951 Thinner (Lord Corporation) with 0.5-1% Chemglaze® 9986 Catalyst (Lord Corporation).

(A.) Coatings were applied to Q-panels (metal panels) as shown in Table 1 below, with Example 1 being a control and Examples 2 and 3 comprising exemplary embodiments of the present invention. Table 2 shows the coating resistivity measured from the Q-panels. All Q-panels were coated using a standard high volume low pressure gravitational (HVLP) spray system. The coating was applied in multiple passes with each pass being approximately 20-25 microns thick. In between coating passes solvent was allowed to flash off for approximately 10-15 minutes in a standard chemical hood. After coating, the Q-panels were cured at 22.2° C./50% RH for 16 hours followed by a post bake at 60° C. for another 16 hours.

TABLE 1

| Formulation | | |
|---|---|---|
| Example | Coating (thickness) | Conductive Additive |
| 1* | Chemglaze V021 (~60 μm) | — |
| 2 | Chemglaze V021 (~60 μm) | CsHFAc at 0.10% (w/w) |
| 3 | Chemglaze V021 (~60 μm) | CsHFAc at 0.20% (w/w) |

*= Control

TABLE 2

| Etectrical Properties | | | |
|---|---|---|---|
| Coating Resistivity (ohm-cm) | Ex. 1 | Ex. 2 | Ex. 3 |
| at 15.6° C./20% RH (Dry) | $3.2 \times 10^{14}$ | $4.9 \times 10^{12}$ | $3.3 \times 10^{12}$ |
| at 22.2° C./50% RH | $(3.3 \times 10^{13})$* | ND | ND |
| at 25.5° C./80% RH (Wet) | $3.3 \times 10^{12}$ | $1.5 \times 10^{11}$ | $9.7 \times 10^{10}$ |
| Dry/Wet Ratio | 97 | 33 | 34 |

*= Value was not measured but is an interpolated estimate based on the data at the 15.6° C./20% RH and 25.5° C./80% RH conditions
ND = Not Determined.

(B.) Coatings applied to rubber substrates. In this portion of the experiment, coatings were applied to the rubber substrate with Examples 4 and 5 as controls, and Example 6 comprising an exemplary embodiment of the present invention. The formulations for the examples of this experiment are listed in Table 3, with the corresponding results listed in Table 4.

TABLE 3

| Formulation and Substrate | | | |
|---|---|---|---|
| Example | Coating (thickness) | Conductive Additive | Rubber Substrate |
| 4* | Chemglaze V021 (~100 μm) | — | ECO rubber with a sulfur-base cure system (hardness ~38 Shore A) |
| 5 | Chemglaze V021 (~88 μm) | — | Carbon black silicone rubber** (hardness ~32 Shore A) |
| 6 | | CsHFAc at 0.20% (w/w) | Carbon black silicone rubber** (hardness ~32 Shore A) |

*= Control
**= Carbon black loaded silicone rubber made by Liquid injection molding process

TABLE 4

| Electrical Properties | | | |
|---|---|---|---|
| Coating Resistivity | Ex. 4 | Ex. 5 | Ex. 6 |
| at 15.6° C./20% RH (Dry) | $1.1 \times 10^{12}$ | ND | $1.7 \times 10^{12}$ |
| at 22.2° C./50% RH | $3.3 \times 10^{11}$ | $2.5 \times 10^{13}$ | ND |
| at 25.5° C./80% RH (Wet) | $6.9 \times 10^{10}$ | ND | ND |
| Dry/Wet Ratio | 16 | ND | ND |
| Hardness (Shore A) | 46 | 3.8 | 37 |

The electrical coating resistivity data shows that the coating of Chemglaze V021 ($H_{12}$MDI—polycaprolactone urethane) onto a ECO rubber core decreases the resistivity by approximately 260 times (Example 1 as compared to Example 4) at the 15.6° C./20% RH condition. The application of the same coating, when applied to a conductive silicone rubber (Example 5), shows a value that is estimated to be similar to the value of the coating (Example 1) on the Q-panel and is too resistive for functional printing. When a conductive additive such as CsHFAc is used, the coating resistivity is decreased to $1.7\times10^{12}$, which is similar to the control roller (Example 4). In addition, this coating is within the desired resistivity range, but has utilized a lower coating thickness (approximately 60 micrometers vs. approximately 100 micrometers) to achieve the target resistivity. In addition, the roller hardness has substantially decreased which is desirable to reduce system banding.

(C.) Mixed prepolymer systems. In this portion of the experiment, coatings were applied to a silicone rubber substrate using the procedure described in section A, above. Coatings were cured for 16 hours at 22.2° C./50% RH followed by a second cure of 16 hours at 100° C. The coatings were then peeled off the silicone rubber substrate affording thin polyurethane films which were evaluated for resistivity across a variety of environmental conditions. The formulations for the examples of this experiment are listed in Table 5, with ingredient ratios listed as weight % solids. The corresponding electrical properties are listed in Table 6.

TABLE 5

Formulations

| | Example | | | | | | | |
|---|---|---|---|---|---|---|---|---|
| | 7 | 8 | 9 | 10 | 11 | 12 | 13 | 14 |
| Chemglaze ® V021 | 47.5 | 47.5 | 43.5 | 42.5 | 28.5 | 28.5 | 27 | 25.5 |
| Vibrathane ® 6060 | 47.5 | 47.5 | 43.5 | 42.5 | 66.5 | 66.5 | 63 | 59.5 |
| Silaplane FM-DA21 | 5 | 5 | 5 | 5 | 5 | 5 | 5 | 5 |
| Polyol 3165 | — | — | 8 | 10 | — | — | 5 | 10 |
| CsHFAc | 0.05 | 0.1 | 0.05 | 0.05 | 0.05 | 0.1 | 0.05 | 0.01 |

TABLE 6

Electrical Properties

| Example # | Film Thickness (μm) | Resistivity (Ohm-cm) 15.6° C./20% RH (Dry) | 22.2° C./50% RH | 25.5° C./80% RH (Wet) | Dry/Wet Ratio |
|---|---|---|---|---|---|
| 7 | 93 | $2.09 \times 10^{11}$ | $3.14 \times 10^{10}$ | $6.65 \times 10^{09}$ | 42 |
| 8 | 98 | $8.46 \times 10^{10}$ | $1.42 \times 10^{10}$ | $3.28 \times 10^{09}$ | 26 |
| 9 | 87 | $8.31 \times 10^{10}$ | $1.04 \times 10^{10}$ | $1.88 \times 10^{09}$ | 44 |
| 10 | 71 | $7.28 \times 10^{10}$ | $1.34 \times 10^{10}$ | $1.96 \times 10^{09}$ | 37 |
| 11 | 49 | $3.65 \times 10^{11}$ | $5.21 \times 10^{10}$ | $1.03 \times 10^{10}$ | 35 |
| 12 | 49 | $1.90 \times 10^{11}$ | $2.72 \times 10^{10}$ | $5.49 \times 10^{09}$ | 35 |
| 13 | 72 | $7.27 \times 10^{10}$ | $1.22 \times 10^{10}$ | $2.38 \times 10^{09}$ | 31 |
| 14 | 59 | $1.51 \times 10^{11}$ | $1.80 \times 10^{10}$ | $3.53 \times 10^{09}$ | 43 |

The foregoing description of the various embodiments and principles of the inventions have been presented for the purposes of illustration and description. It is not intended to be exhaustive or to limit the invention to the precise forms disclosed. Many alternatives, modifications, and variations will be apparent to those skilled in the art. Moreover, although various inventive concepts have been presented, such aspects need not to be utilized in combination, and various combinations of inventive aspects are possible in light of the various embodiments provided above. Accordingly, the above description is intended to embrace all possible alternatives, modifications, combinations and variations that have been discussed or suggest herein, as well as all others that fall within the principles, spirit and broad scope of the invention as defined by the claims.

What is claimed is:

1. A method for making a developer roll having a tuned resistivity, comprising:

molding a metal shaft with a conductive or semi-conductive soft rubber to form a rubber core;

modifying an outside surface of the rubber core to form an —OH rich surface layer;

coating the modified rubber core with a polyurethane prepolymer and a conductive additive; and adhering the coating to the outside surface of the rubber core by chemically bonding an isocyanate portion of the polyurethane prepolymer with the —OH rich surface layer.

2. The method of claim 1, wherein chemically bonding the isocyanate portion of the polyurethane prepolymer with the —OH rich surface layer includes chemically bonding a caprolactone-$H_{12}$MDI urethane with the —OH rich surface layer.

3. The method of claim 2, wherein coating the modified rubber core with the conductive additive includes coating the modified rubber core with cesium hexafluoroacetylacetonate.

4. The method of claim 2, wherein chemically bonding the caprolactone-$H_{12}$MDI urethane with the —OH rich surface layer includes chemically bonding a mixture of caprolactone-$H_{12}$MDI urethane and caprolactone-TDI urethane with the —OH rich surface layer.

5. The method of claim 1, wherein coating the modified rubber core with the conductive additive includes coating the modified rubber core with one or more ionic additives, an inherently conductive polymer (ICP) or a combination thereof.

6. The method of claim 5, wherein coating the modified rubber core with the conductive additive includes coating the modified rubber core with an ionic additive selected from the group consisting of: $LiPF_6$, $LiAsF_6$, $LiN(SO_2CF_3)_2$, $LiC(SO_2CF_3)_3$, $LiPF_3(C_2F_5)$, $Cs(CF_3COCH_2COCF_3)$, $KPF_6$, $NaPF_6$, $CuCl_2$, $FeCl_3$, $FeCl_2$, $Bu_4NPF_6$, $Bu_4NSO_3CF_3$, $Bu_4NCl$, $Bu_4NBr$ and a combination thereof.

7. The method of claim 1, further comprising coating the modified rubber core with a curative additive selected from the group consisting of: polycaprolactone polyols, polyether polyols, polyester polyols, aliphatic-polycarbonate polyols, polybutadiene diol, polydimethylsiloxane polyols, polydimethylsiloxane diamines and a combination thereof.

8. The method of claim 7, wherein coating the modified rubber core with the curative additive includes coating the modified rubber core with an alkoxylated trimethylolpropane polyether polyol.

9. The method of claim 1, wherein modifying the outside surface of the rubber core to form an —OH rich surface layer includes applying a UV-ozone treatment to the outside surface of the rubber core.

10. The method of claim 1, wherein molding the metal shaft with the conductive or semi-conductive soft rubber to form the rubber core includes molding the metal shaft with one or more rubbers selected from the group consisting of: silicone rubber, nitrile rubber, ethylene propylene (EP) copolymers, polybutadiene, styrene-co-butadiene, isoprene rubber, and a blend of one or more of the rubbers.

11. The method of claim 1, wherein coating the modified rubber core with the polyurethane prepolymer includes coating the modified rubber core with a polyurethane prepolymer having a polyol portion selected from the group consisting of a polyether, a polyester, a polybutadiene system and a combination thereof.

12. The method of claim 1, wherein coating the modified rubber core with the conductive additive includes coating the modified rubber core with carbon black, carbon fibers, graphite or a combination thereof.

* * * * *